(12) United States Patent
Gopalkrishna et al.

(10) Patent No.: US 9,182,781 B2
(45) Date of Patent: Nov. 10, 2015

(54) BACKPLANE COMMUNICATION SYSTEM

(75) Inventors: Nayak Gopalkrishna, Bangalore (IN); Kanwarjit Singh, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 129 days.

(21) Appl. No.: 14/008,083

(22) PCT Filed: Aug. 11, 2011

(86) PCT No.: PCT/IN2011/000533
§ 371 (c)(1),
(2), (4) Date: Dec. 8, 2013

(87) PCT Pub. No.: WO2012/131693
PCT Pub. Date: Oct. 4, 2012

(65) Prior Publication Data
US 2014/0089721 A1    Mar. 27, 2014

(30) Foreign Application Priority Data
Mar. 31, 2011    (IN) .......................... 1075/CHE/2011

(51) Int. Cl.
G06F 1/08    (2006.01)
G06F 1/10    (2006.01)
H04J 3/06    (2006.01)

(52) U.S. Cl.
CPC .. G06F 1/08 (2013.01); G06F 1/10 (2013.01); G06F 2213/0038 (2013.01); H04J 3/0688 (2013.01)

(58) Field of Classification Search
CPC ................................. G06F 1/08; H04J 3/0685
USPC ........................................................ 713/501
See application file for complete search history.

(56) References Cited

U.S. PATENT DOCUMENTS

| 6,597,214 B1 * | 7/2003 | Singh et al. .................... 327/141 |
| 6,754,745 B1 * | 6/2004 | Horvath et al. ................. 710/58 |

* cited by examiner

Primary Examiner — Albert Wang
(74) Attorney, Agent, or Firm — Brundidge & Stanger, P.C.

(57) ABSTRACT

The invention relates to an improved backplane communication system. In one embodiment this is accomplished by a central data processing card including at least one master central card and a plurality of slave central card, wherein each master central card and the slave central card having a first SerDes (serializer-deserializer), a first clock and a first faster local clock, a line card including a second SerDes (serializer-deserializer), a clock selection module and a second faster local clock and a serial communication channel coupling the central data processing card and the line card, wherein the master central card uses the first faster local clock to transmits the data at a rate higher than actually required, wherein the transmitted data includes a stuff data to adjust to the link data rate between the central data processing card and line card.

7 Claims, 2 Drawing Sheets

BACKPLANE COMMUNICATION SYSTEM

FIELD OF THE INVENTION

The present invention relates to backplane signaling system for example to a hitless and fast backplane signaling system.

BACKGROUND OF THE INVENTION

A backplane system is a Printed Circuit Board (PCB) that connects several connectors or circuit components in parallel to each other. A backplane signaling system is generally a high-speed communication signaling system wherein each component communicates to other components at a very high speed. A typical backplane signaling system comprises a central/main card that runs on a single master clock source, various line cards and modules etcetera. The line card may be defined as a modular electronic circuit on the printed circuit board.

Conventional system as shown in FIG. 1, where the line card 120 and the central/main card set 110 communicate with each other. The central card set 110 typically comprises of a master card 140 and a slave card 150. The master and the slave card may communicate to the line card simultaneously. If the one of the central cards and the line card are not working at the same frequency, the communication may not be proper because there is no room for temporary frequency shift. If the temporary frequency shift is applied, it may result in data loss. Therefore, a single master clock 160 may be used by all the modules and/or line cards to transmit and receive data. High speed communication between the modules may require high quality precision clock. Further, the clock signal used in the communication is required to be clean or cleaned at the receiving end. The clean clock signal may be defined as distributing clock signal properly in the communication and the cleaning of the clock signal may be defined as recovering the clock signal properly at the receiving end. However, the cleaning process of the clock signal is not economical.

Therefore, it would be desirable to have an improved and effective backplane signaling system is required that can obviate the above-mentioned problems.

SUMMARY OF THE INVENTION

An aspect of the present invention is to address at least the above-mentioned problems and/or disadvantages and to provide at least the advantages described below.

Accordingly, an aspect of the present invention is to provide an improved backplane communication system comprising a central data processing card set including at least one master central card and a plurality of slave central card, wherein each master central card and the slave central card having a first SerDes (serializer-deserializer), a first clock and a first faster local clock, a line card including a second SerDes (serializer-deserializer), a clock selection module and a second faster local clock and a serial communication channel coupling the central data processing card and the line card, wherein the master central card uses the first faster local clock to transmits the data at a rate higher than actually required, wherein the transmitted data includes a stuff data to adjust to the link data rate between the central data processing card and line card.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
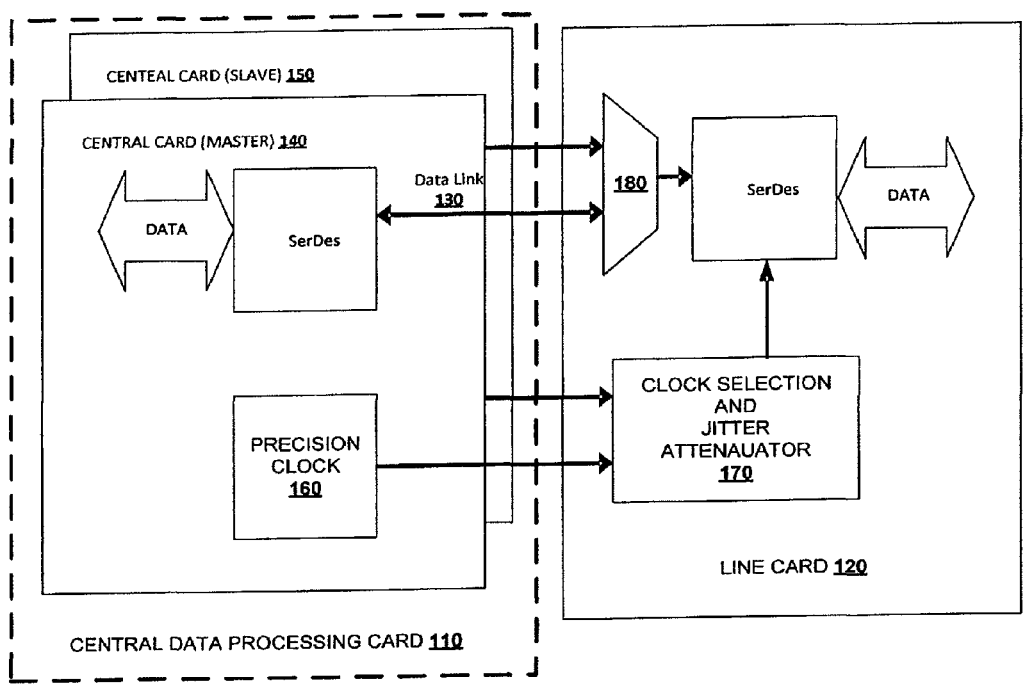
FIG. 1 illustrates a backplane switching system with two central data processing cards talking to a line card.
Figure 2:
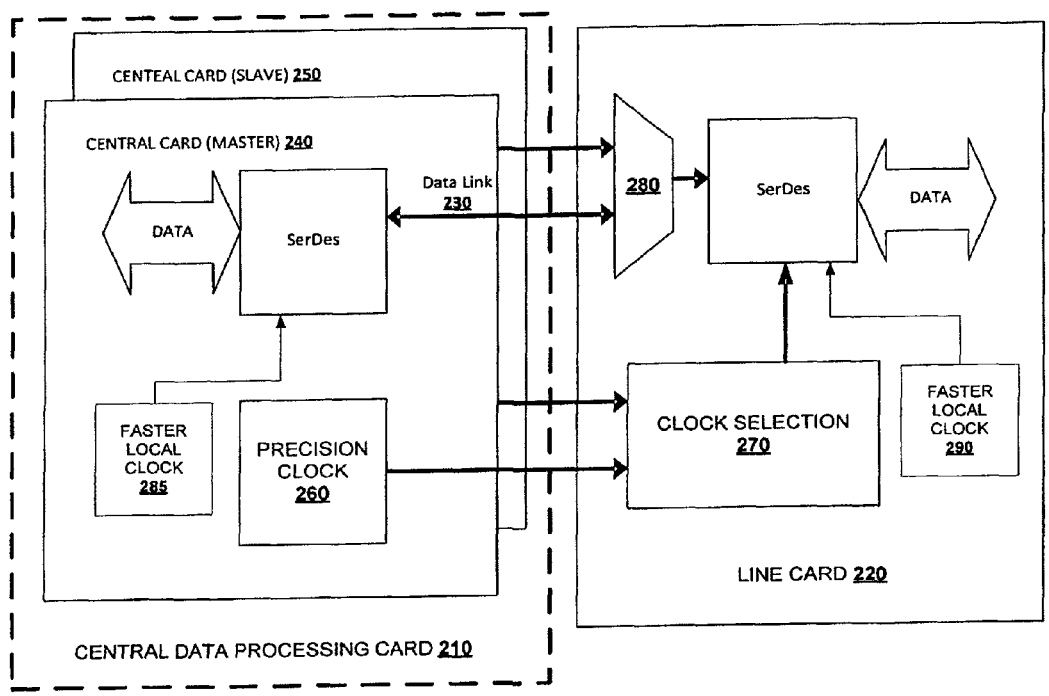
FIG. 2 shows the improved backplane switching system with two central data processing cards having a precision and a faster clock, talking to a line card according to an embodiment herein.

FIGS. 1-2, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

The present invention describes in conjunction with the accompanying drawing an improved backplane switching system. The invention provides an integrated solution for a communication system along with hitless switchover.

According to one embodiment of the present invention and as represented in FIG. 2 block diagram of the improved backplane switching system is shown.

The improved backplane switching system includes a central data processing card 210 having a first SerDes (serializer-deserializer) and a first clock, a line card 220 comprising a second SerDes (serializer-deserializer), a second clock and a clock selection module 270 and a communication channel 230. The communication channel may be a serial link enabling communication between the line card and the central data processing card. The central data processing card set may comprise of a master card 240 and a slave card 250. The slave card and the master card may communicate simultaneously to the line card through the serial link. The serial link may run at a speed slightly higher than the required data rate. Said link does not require master clock source, instead the link uses a predefined clock frequency. The central data processing card 210 and the line card 220 use the faster first local clock 285 and the faster second local clock 290 respectively. The faster first local clock and the faster second local clock can be any local oscillator. The faster first local clock and the faster second local clock may have a common frequency with a known limit of frequency offset allowed between them. The central data processing card may transmit data including a clock signal generated by the faster first local clock to the line card through the serial link.

However as the serial link is running at a speed higher than actually required data rate, a stuff data may be inserted by the central data processing card to adjust to the original data rate. The stuff data must be chosen such that it is known to both the central data processing card and the line card. When there is an upward clock frequency shift, the number of inserted stuff data may reduces and in the case of a downward clock frequency shift, the number of stuff data may increases. The mechanism for inserting the stuff data may also be known to both the central data processing card and the line card. Therefore, due to the stuff data the serial link is adjusted to the original data rate. A standard data rate may be chosen for the link. The standard data rate may be used for almost any standard components/modules. Therefore, the invention provides room for all standard modules and reduces the overall cost of implementation. For example if it is required to implement FPGA (Field Programmable Gate Array) having internal SerDes, the requirement may be met/replaced by a standard FPGA along with external standard SerDes thereby providing a cost effective implementation. The central card sends out the reference clock to the line card so that the actual data rate without the stuff data is known to the line card. This clock will be used by the line card as a reference to clock out the data internally after removing the stuff data.

However, the central data processing card and the line card may have internal SerDes respectively to serialize the data to be transmitted by them and deserialize the data received by them. The line card may have a data buffer to store the received data. The received data may be from the slave card or the master card. The data transmitted by the master card may be slightly ahead of the data transmitted by the slave card or vice versa. Therefore, the line card may get enough time to perform a clean/controlled switchover. The clean/controlled switchover is therefore preferably performed when the slave card is configured to transmit the data with a slight delay. The data transmission may be broken into fixed size frames. The frame boundaries may be known to both the central data processing card and the line card. The line card may perform hitless switchover from one central data processing card to another central data processing card or from the master card to the slave card by discarding a part of the frame received from the master card and switching to the slave card on the next frame boundary.

In another embodiment of the invention a master clock (refer FIG. 2) may also be implemented in the central data processing card. However, the master clock (refer FIG. 2) may not be of high quality/precision. The master clock signal may also be distributed to the actual data rate. At last, the line card may recover the data and send it to another line card or another module to enable further communication or processing.

Thus, the present invention provides a fast and economical backplane signaling in which a separate jitter attenuator is not required. Further, an effective hitless switchover method of communication is provided. Furthermore, the invention incorporates open end architecture to allow/incorporate any standard component in the system without requiring component modification. Thereby the invention avoids complex system design and reduces costs.

FIGS. 1-2 are merely representational and are not drawn to scale. Certain portions thereof may be exaggerated, while others may be minimized. FIGS. 1-2 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

We claim:

1. An improved backplane communication system comprising:
   a central data processing card set including at least one master central card and a plurality of slave central card, wherein each master central card and the slave central card having a first SerDes (serializer-deserializer), a first clock and a first faster local clock;

a line card including a second SerDes (serializer-deserializer), a clock selection module and a second faster local clock; and a serial communication channel coupling the central data processing card and the line card, wherein the master central card uses the first faster local clock to transmit the data at a rate higher than actually required, wherein the transmitted data includes a stuff data to adjust to the link data rate between the central data processing card and line card, wherein the first fast local clock and the second fast local clock maintains a standard data rate between the links to allow usage of standard off the shelf components thereby reducing the overall cost.

2. The backplane communication system of claim 1, wherein the stuff data chosen such that it is known to both the transmitter and the receiver of the system.

3. The backplane communication system of claim 1, wherein the line card receives the data at a higher rate and further processes the same to recover the actual data to send out to the processing blocks at the actual data rate.

4. The backplane communication system of claim 1, wherein the communication channel may be a serial link enabling communication between the line card and the central data processing card.

5. The backplane communication system of claim 1, wherein the slave card and the master card communicate simultaneously to the line card through the serial link.

6. The backplane communication system of claim 1, wherein the first clock and the second clock can be any local oscillator.

7. The backplane communication system of claim 1, wherein the first clock and the second clock have a common frequency with a known limit of frequency offset allowed between them.

* * * * *